June 8, 1965 J. J. TIEMANN 3,187,412

METHOD OF MOUNTING AND ALIGNING TRANSDUCERS ON DELAY LINES

Filed April 26, 1963 2 Sheets-Sheet 1

Inventor:
Jerome J. Tiemann,
by John F. Ahern
His Attorney.

June 8, 1965 J. J. TIEMANN 3,187,412

METHOD OF MOUNTING AND ALIGNING TRANSDUCERS ON DELAY LINES

Filed April 26, 1963 2 Sheets-Sheet 2

Inventor:
Jerome J. Tiemann,
by John F. Ahern
His Attorney.

United States Patent Office 3,187,412

Patented June 8, 1965

3,187,412

METHOD OF MOUNTING AND ALIGNING TRANSDUCERS ON DELAY LINES

Jerome J. Tiemann, Burnt Hills, N.Y., assignor to General Electric Company, a corporation of New York Filed Apr. 26, 1963, Ser. No. 275,872
4 Claims. (Cl. 29—155.5)

This invention relates to a method for mounting a transducer element in aligned relationship on the end surface of a longitudinally extending delay line.

In the design of electrical circuits, it is frequently highly desirable to provide an electrical signal which is substantially identical to another electrical signal which occurred earlier in time. Such a signal is referred to in the art as a delayed signal. When the desired delay time is short, the delay may be effected by a transmission line or by a lumped parameter electrical delay line of a relatively modest size and cost. However, when it is desired to provide a relatively long delay time, electronic circuit means become less practicable and sonic delay lines are oftentimes used.

Sonic delay lines enjoy a significant advantage over electronic delay lines when a long delay time is desired. Sound is propagated with a velocity which is slow compared to the velocity with which a signal is propagated along an electrical delay line. It is this marked difference in the velocities of propagation which render the sonic delay line particularly attractive for effecting long time delays. However, there are difficulties to be overcome when utilizing sonic delay lines. One of the greatest obstacles to be overcome pertains to converting the originating electrical signal to be delayed into a mechanical force and transmitting the mechanical force to a sound propagating medium, hereinafter referred to as a delay line, in the form of a sound wave which faithfully reproduces the essential characteristics of the originating electrical signal. Fidelity of conversion and transmission are required if the recovered, time-delayed, electrical signal is to be substantially identical to the originating electrical signal. Furthermore, there is generally a loss of signal energy (insertion loss) associated with this conversion, so that the recovered signal may be very much weaker than the originating signal. It is the problems of fidelity of response and insertion loss to which this invention is generally directed.

In order to convert an electrical signal into a mechanical force suitable for transmission through the delay line, some form of electro-mechanical transducer is required. Normally the transducer element is constituted of electrostrictive materials, such as barium titanate or piezoelectric materials, such as quartz. It is known that bodies constituted of such materials undergo changes in dimension when an electrical field impressed thereacross is varied. Magnetostrictive materials such as nickel, alloys of nickel and cobalt, and certain ferrites are also used for this purpose. In this case a variation of the applied magnetic field produces a change of the dimension of the transducer.

When a transducer element is affixed to the end of a delay line, and an electrical signal is supplied thereto, sonic waves will be induced in the delay line corresponding to the electrical signal. However, unless the surface of the transducer element is in alignment with the opposing surface of the delay line, the fidelity of the conversion from electrical to sonic signal and the insertion loss will be deleteriously affected. The difficulties attending accurate alignment of a transducer element and an end surface of a delay line are compounded when any one of the transverse dimensions of the delay line are made very small, for example, in the order of .001" to .050".

Delay lines of such small transverse dimensions are particularly effective, and indeed required, in many applications, and it is particularly desirable to have some means available to easily and accurately align a transducer element with the end surface of delay lines of such very small transverse dimensions.

Accordingly, it is an object of this invention to provide improved means for mounting a transducer element in accurately aligned relationship on a delay line.

It is another object of this invention to provide an improved method for mounting a transducer element in aligned relationship on one end surface of a longitudinally extending delay line of small transverse dimension.

Briefly, in accordance with the present invention, a transducer element, having one surface thereof of relatively large transverse dimensions, is bonded by a suitable bonding agent to the end surface of a delay line of relatively small transverse dimensions. The larger surface of the transducer element overlaps the end surface of the delay line in at least one direction. Thereafter, a stream of particulate abrasive material is projected substantially parallel to the longitudinal axis of the delay line and toward the transducer element to effect erosion of all portions of the transducer element which are not masked by the delay line. The resulting assembly is a delay line having an accurately aligned transducer element disposed on one end thereof.

My invention will be better understood from the following description taken in connection with the accompanying drawing and its scope will be pointed out in the appended claims.

Figure 1:
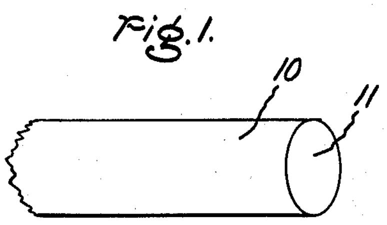
FIGURE 1 shows the end portion of a delay line suitable for use in the present invention.

Normally, the size of the drawings in FIGURES 1–7 represent greatly enlarged views of the actual delay line and transducer element utilized in the method of the present invention. As stated above, it is generally desirable to provide delay lines having transverse dimensions which are small. The reason for this is that dispersion, i.e., a change of longitudinal wave velocity with frequency, occurs when the wave length of the transmitted wave is in the order of magnitude of the transverse dimensions of the delay line. Such dispersion is known in the art as configurational dispersion. Therefore, in order to provide a constant time delay at high frequencies, the transverse dimensions of the delay line must be small. It it not uncommon, for example, to utilize cylindrical delay lines having a diameter between .005" and .010". Such a delay line presents a cross-sectional area no greater than that of the punctuation mark occurring at the end of a sentence on a printed page. The difficulties attendant affixing and accurately aligning a transducer element to the end of such a delay line are too obviously manifest to need further amplification.

Another reason for providing a delay line of small transverse dimensions is to achieve a large bandwidth of propagated frequencies. With the usual delay lines of either solid wire or rod, regardless of whether or not magnetostrictive effects are present in the delay line, the band of frequencies which may be transmitted without dispersion is a roughly constant percentage of the frequency where undesirable modes appear. The frequency where these modes appear is oftentimes referred to as the cut-off frequency. It is apparent that as the cut-off frequency is increased that the useful band of frequencies will similarly increase. Therefore, a delay line having a higher maximum frequency will also enjoy a larger range of permissible frequencies, or possess larger bandwidth. As mentioned above, the transverse dimensions of the wire must be made small in order to achieve the high cut-off frequency which in turn precipitates a large bandwidth. One well-known advantage of a large bandwidth is that very short pulses may be more faithfully transmitted and reproduced.

Accurate alignment of the transducer element on the end surface of the delay line is required for optimum results. By referring to the transducer element and delay line as being "aligned" or "in aligned relationship" it is meant herein and in the appended claims not only that the transducer element and delay line be in coaxial relationship, in the case of a cylindrical delay line, for example, but also that the juxtaposed surfaces of the transducer element and delay line are coextensive with neither overlapping the other. In other words, there is no abrupt change or discontinuity in transverse dimension progressing from the end of the delay line through the juncture of the delay line and transducer element and into the transducer element. Such a smooth transition is essential in order to provide each incremental portion of the transducer element with a substantially equal load. Such equality of loading becomes particularly significant when the acoustic impedance of the delay line is matched, or made equal, to that of the transducer element in order to achieve maximum transfer of mechanical energy between the two. In any event, when the transducer element and the delay line are not aligned, spurious modes of excitation and undesirable reflections and distortions occur which degrade the fidelity of response of the sonic delay line system.

In accordance with the present invention, a method for mounting the transducer element to a delay line is provided wherein it is not required that extremely small transducer elements be handled and manipulated. In addition, the method of this invention results in self-alignment of the transducer element with the delay line. It will be appreciated that the invention has particular utility when practiced with delay lines of extremely small transverse dimensions.

FIGURE 1 shows a delay line 10 which has been selected, for purposes of illustration only, to be of circular cross section. Delay line 10 may be constituted of a wide variety of metals, such as aluminum or magnesium, although, preferably, delay line 10 is constituted of an alloy of iron, nickel, cobalt, chromium, and titanium, which is commonly used as the material for delay lines. The advantages of this alloy include an ability to be magnetized, providing a magnetostrictive delay line. In addition, this alloy can be heat treated to provide a constant delay over a wide range of temperature.

Figure 2:
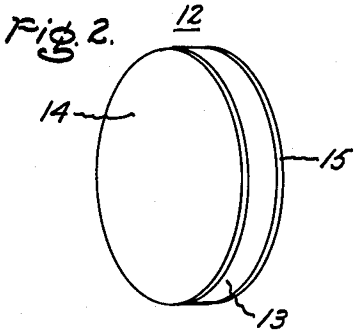
FIGURE 2 shows a transducer element which may be used in the practice of the present invention.

In FIGURE 1, only the end portion of delay line 10 is shown, and it can be seen that end surface 11 of delay line 10 is a generally planar circular surface. FIGURE 2 illustrates an electro-mechanical transducer element 12, suitable for use in the method of this invention in conjunction with delay line 10 of FIGURE 1. Transducer element 12 comprises a main body portion 13 which is, preferably, constituted of material having electrostrictive or piezoelectric characteristics. Opposed surfaces of transducer element 12 are provided with thin highly conductive coated surfaces 14 and 15 which may, conveniently, be constituted of silver and applied by vapor plating. It will be noted that one surface of transducer element 12, namely surface 14, generally complements that of end surface 11 of delay line 10. By this it is meant that if end surface 11 is generally planar (as illustrated) then surface 14 similarly will be planar, but, in the event that end surface 11 is convex or concave, for example, then surface 14 would have a reverse configuration and be either concave or convex, respectively.

The purpose served by transducer element 12 is to convert electrical energy to mechanical energy and vice-versa. For example, when a varying electrical signal is applied across conductive coating surfaces 14 and 15 of transducer 12, body portion 13 thereof undergoes a corresponding change in dimension, resulting in a force being transmitted to a member connected to surface 14 or 15. Normally, transducer element 12 will be poled to undergo changes in dimension which affect the longitudinal spacing between surfaces 14 and 15, although it is well-known that transducer element 12 may equally well be circularly poled, in which case the surfaces 14 and 15 twist relative to one another in response to variations in the applied electric signal.

Figure 3:
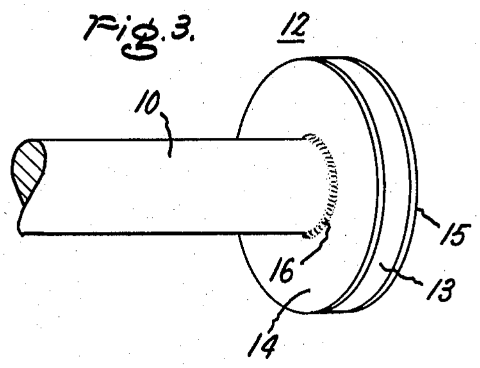
FIGURE 3 is a side view of an assembled delay line and transducer element in an intermediate step in the practice of the present invention.
Figure 4:
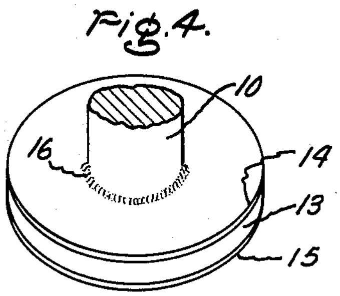
FIGURE 4 is an end view of the assembly of FIGURE 3.

FIGURES 3 and 4 show transducer element 12 and the delay line 10 in assembled relationship in an intermediate step in the practice of this invention. Transducer element 12 has been positioned relative to delay line 10 so that surface 14 is in juxtaposition to end surface 11. End surface 11 is of lesser area than surface 14, and delay line 10 and transducer element 12 are positioned so that surface 14 completely overlaps end surface 11.

Transducer element 12 and delay line 10 are secured in the above-mentioned position by a suitable bonding material 16, which may be any of a large number of adhesives, but, preferably, is constituted of conductive epoxy cement. This latter bonding agent not only results in rigid assembly of parts but also allows one electrical contact to transducer element 12 to include wire 10.

Figure 5:
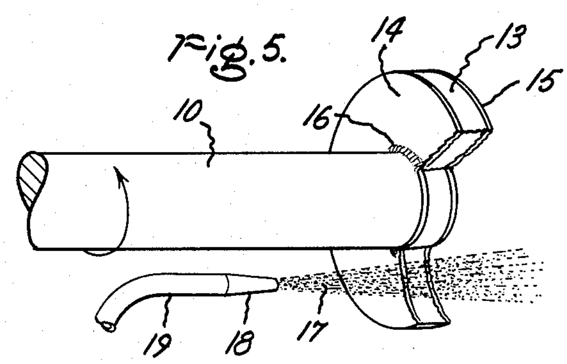
FIGURE 5 illustrates, diagrammatically, another step in the method of this invention.

FIGURE 5 shows, diagrammatically, a final step in the method of this invention. In FIGURE 5 part of the overlapping portion of transducer element 12 has been eroded away by a narrow stream 17 of finely powdered, particulate abrasive material. Stream 17 is projected substantially parallel to the longitudinal axis of delay line 10 and toward transducer element 12. Stream 17 is projected through nozzle 18 which is supplied with particulate abrasive material in a convenient carrier medium, preferably an air stream, by hose 19. Hose 19 is terminated at its other end at a source of pressurized particulate abrasive material, such as used in sandblasting machines, for example.

It has been found that when stream 17 is constituted of the more finely powdered commercially available abrasive material, such as silicon-carbide, for example, that the erosion of delay line 10 at portions where stream 17 may impinge thereupon, is negligible by comparison with the rapid attack and erosion of the very frangible materials normally used for body 13 of transducer element 12. As the assembly is turned, as by twisting delay line 10, portions of transducer element 12 which are not masked by the longitudinal projection of delay line 10 are eroded, leaving only the masked portion.

Figure 6:
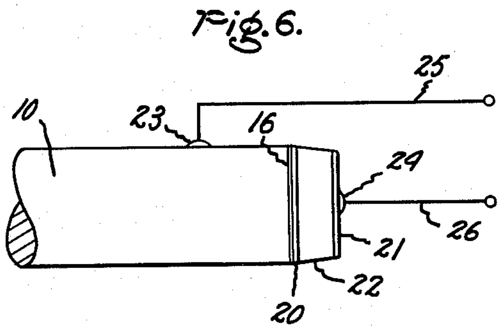
FIGURE 6 shows the completed assembly of the sonic delay line and transducer element constructed in accordance with the present invention.

FIGURE 6 shows a completed assembly manufactured in accordance with the method of this invention. As shown, only the portion of transducer element 12 which was masked by delay line 10 remains mounted on the end of longitudinally extending delay line 10. Thin conductive coatings 20 and 21 correspond to thin coincidence surfaces 14 and 15 of FIGURE 2. The body 22 of the transducer of FIGURE 6 corresponds to body 13 in FIGURE 2. A contact 23 is shown attached to delay line 10 and a contact 24 is connected to conductive coating 21.

Electrical signals are provided to contacts 23 and 24 through conductive lines 25 and 26, respectively. In the arrangement shown, adhesive 16 is conductive, as is delay line 10, so that the potential applied to line 25 appears substantially undiminished in magnitude across conductive coating 20. In the event that either adhesive 16 or line 10 is not conductive, or in the event that neither is conductive, then contact 23 must be attached directly to conductive surface 20. Since the structure of FIGURE 6 is normally very much smaller than illustrated, the embodiment of electrical contacts shown therein is to be greatly preferred.

As shown in FIGURE 6, the transducer element is slightly tapered away from the delay line. Of course, the amount of taper is largely controlled by the configuration of stream 17, as shown in FIGURE 5, as well as the proximity of nozzle 18 to the surface of delay line 10. A sizable taper has been found to provide a beneficial effect when employed with certain combinations of delay line and electrostrictive materials.

In operation a variable electrical signal is supplied to lines 25 and 26 resulting in either a lateral displacement of surfaces 20 and 21 or a relative twisting of these surfaces, depending upon whether the transducer element is longitudinally poled or circularly poled. The mechanical displacement is transferred to delay line 10. Delay line 10 may be supplied with another similar transducer element at its other end for converting the mechanical displacements back into electrical signals, or, the other end of delay line 10 may be terminated in a reflecting impedance, in which case the mechanical displacement is reflected back to the originating transducer. It will be appreciated that the former mode of operation is preferred in instances wherein a continuous supply of time-delayed signals is required. The latter mode of operation is preferred in many applications concerned with delayed pulses, since the mechanical displacement, representing the pulse, travels the length of the line twice, allowing a line to be used which is one-half the length of that required for a similar time delay when operating in the first mode. Also, only one transducer element need be utilized when operating in the second mode.

Figure 7:
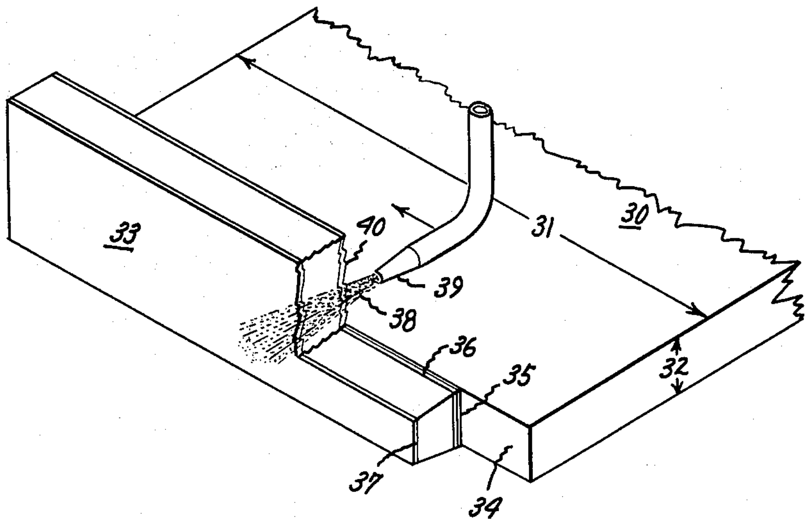
FIGURE 7 illustrates an intermediate step in this invention as practiced with a strip delay line.

FIGURE 7 shows an alternative delay line 30 with which practice of the present invention has proved invaluable. Delay line 30 is in the general form of a strip having a transverse width 31 much greater than the transverse thickness 32. Such delay lines are used to produce special effects and widths in the order 1" and thicknesses in the order of .01" are not unusual. It is virtually impossible to produce a transducer element of such transverse dimensions since the brittle material of transducer elements causes them readily to break into segments of substantially equal dimensions. Also, alignment problems are compounded when the tape is curved about its longitudinal axis as a matter of design or through manufacturing tolerances.

In accordance with the present invention a transducer element 33 having relatively large transverse dimensions is positioned in juxtaposition to end surface 34 of delay line 30. Element 33 is secured in position to delay line 30 by a suitable bonding agent 35, which is, preferably, a conductive epoxy resin adhesive so that electrical connection to thin conductive coating surface 36 of element 33 may be effected through delay line 30 (which normally is conductive). The remaining electrical connection is effected by direct contact with thin conductive coating surface 37 of element 33.

A finely powdered stream 38 of abrasive material is projected, as by nozzle 39, substantially parallel to the longitudinal axis of delay line 30 and toward the overlapping portion 40 of element 33 to effect erosion thereof. All portions of element 33 not masked by the longitudinal projection of delay line 30 are thereby removed as nozzle 39 is moved transversely of delay line 30. The view of FIGURE 7 is taken after erosion has been completed on the underside of delay line 30 and about one-half completed on the upper side thereof. Stream 38 has negligible effect on the malleable material usually used for delay lines, while a rapid attack and erosion of the frangible material of the transducer element is effected. The resulting assembly is a delay line system wherein a transducer element is affixed in accurately aligned relationship on the end surface of the delay line.

There has been shown and described herein a method for mounting a transducer element in accurately aligned relationship on the end surface of a delay line. The method described has use in the fabrication of delay line systems of all sizes since an accurate alignment may be achieved without the use of special precision instruments. This is of particular significance when it is desired to mass-produce sonic delay line systems. In addition, the method of this invention permits the accurate alignment of transducer elements on delay lines of extremely small transverse dimensions. With such delay lines, the method of this invention has greatly utility whether or not mass-production of units is contemplated.

While I have shown and described my invention with respect to delay line systems, there are many analogous and equivalent systems with which practice of this invention has utility. For example, the delay line can have a useful resonance, or be tuned, to provide the frequency selective means for filters, oscillators, I.F. or carrier amplifiers and the like, without departing from the scope of this invention. It is intended, therefore, that the term delay line as used herein and in the appended claims include such mere variations in the specific application to which the line and transducer element are put.

While I have shown the preferred embodiments of my invention, many modifications and alterations thereof will readily occur to those skilled in the art. For example, the abrasive material may be projected from a nozzle disposed about the delay line, in which case no relative movement between these two members would be required. Therefore, it is intended by the appended claims to include this and other variations and modifications such as fall within the true spirit and scope of this invention.

What I claim as new and desire to secure by Letters Patent of the United States is:

1. The method of mounting a transducer element in aligned relationship on the end surface of a longitudinally extending sonic delay line, which method comprises: providing a transducer element having one surface which generally complements that of said end surface; positioning said element relative to said delay line so that a portion of said one surface is in juxtaposition to said end surface and so that said one surface overlaps said end surface in at least one direction; bonding said element to said delay line in said postion; and, aligning and shaping said element by projecting a stream of particulate abrasive material substantially parallel to the longitudinal axis of said delay line and toward said element to effect erosion of the overlapping portion of said element so that only portions of said element masked by said delay line remain.

2. The method of mounting a transducer element in aligned relationship on one end surface of a longitudinally extending sonic delay line, which method comprises: providing a transducer element having one surface which generally complements that of said end surface, said one surface having a greater area than said end surface; positioning said element relative to said delay line so that a portion of said one surface is in juxtaposition to said end surface and so that said one surface overlaps said end surface in at least one direction; bonding said element to said delay line in said position; aligning and shaping said element by projecting a narrow stream of particulate abrasive material substantially parallel to the longitudinal axis of said delay line and toward said element; and, rotating said delay line to effect erosion of the overlapping portion thereof so that only portions of said element masked by the longitudinal projection of said delay line remain.

3. The method of mounting a transducer element in aligned relationship on one end surface of a longitudinally extending conductive sonic delay line, which method comprises: providing a transducer element having one surface which generally complements that of said end surface, said one surface having a greater area than said end surface; positioning said element relative to said delay line so that a portion of said one surface is in juxtaposition to said end surface and so that said one surface completely overlaps said end surface; bonding with conductive adhesive said element to said delay line in said position; and aligning and shaping said element be projecting a narrow stream of finely powdered particulate abrasive material substantially parallel to the longitudinal axis of said delay line and toward said element to effect erosion of the overlapping portion thereof so that only portions of said element masked by the longitudinal projection of said delay line remain.

4. The method of mounting a transducer element in aligned relationship on one end surface of a longitudinally extending strip delay line, which method comprises: providing a transducer element having one surface which generally complements that of said end surface, said one surface having a transverse dimension substantially greater than the thickness of said line; positioning said element relative to said delay line so that a portion of said one surface is in juxtaposition to said end surface and so that said one surface overlaps said end surface in the direction of said transverse dimension; bonding said element to said delay line in said position; and, aligning and shaping said element by projecting a stream of particulate abrasive material substantially parallel to the longitudinal axis of said delay line and toward said element to effect erosion of the overlapping portion of said element so that only portions of said element masked by the longitudinal projection of said delay line remain.

References Cited by the Examiner

UNITED STATES PATENTS 3,111,741 11/63 Allen et al. ---------- 29—155.55

WHITMORE A. WILTZ, *Primary Examiner.*

JOHN F. CAMPBELL, *Examiner.*